Nov. 30, 1926.

A. K. PEHRSON 1,608,665

SIDE BEARING

Filed Jan. 28, 1925     2 Sheets-Sheet 2

Patented Nov. 30, 1926.

1,608,665

UNITED STATES PATENT OFFICE.

ALFRED K. PEHRSON, OF BELLEVUE, PENNSYLVANIA, ASSIGNOR TO PRESSED STEEL CAR COMPANY, OF PITTSBURGH, PENNSYLVANIA, A CORPORATION OF NEW JERSEY.

SIDE BEARING.

Application filed January 28, 1925. Serial No. 5,243.

This invention relates to railway cars and particularly railway passenger cars of the articulated type in which each car unit comprises a plurality of car bodies, the adjacent ends of two of which are carried by a single truck and has for an object the provision of side supports or bearings between the truck and the adjacent ends of two of the bodies of a car unit.

Another object of the invention is to provide the adjacent ends of two of the bodies of an articulated car unit with a side bearing which is automatically adjustable to the car truck and to the car bodies at all times.

Another object of the invention is to provide the adjacent ends of two of the bodies of an articulated car unit with roller side bearings which are adapted to engage a side bearing mounted on an adjacent car truck.

These and other objects will be apparent from the following description.

Figure 1:
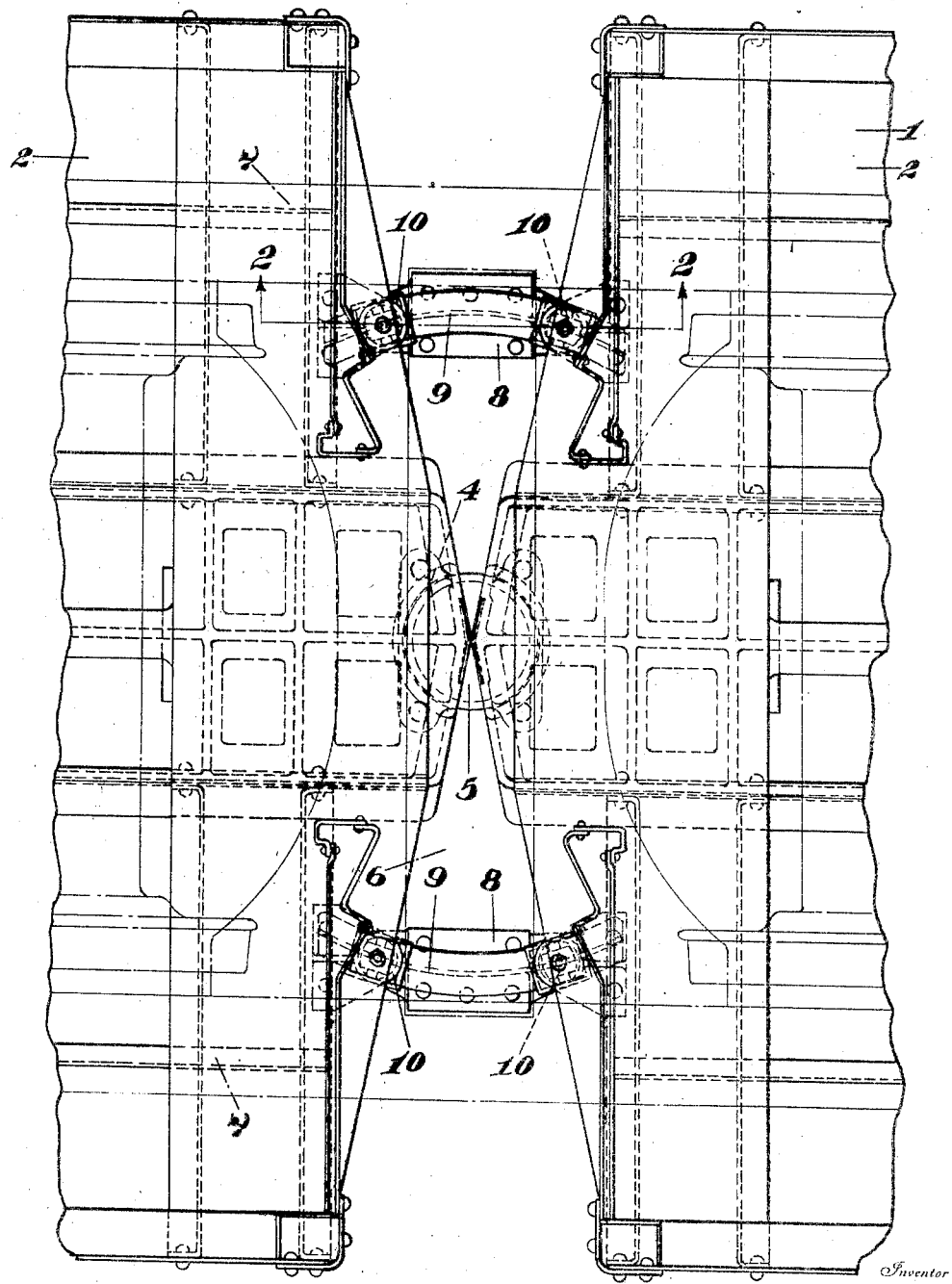
Figure 2:
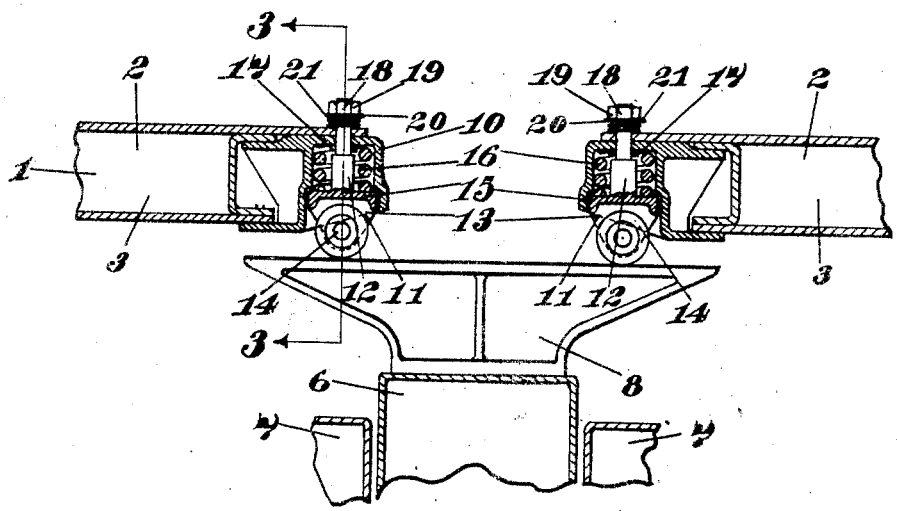
Figure 3:
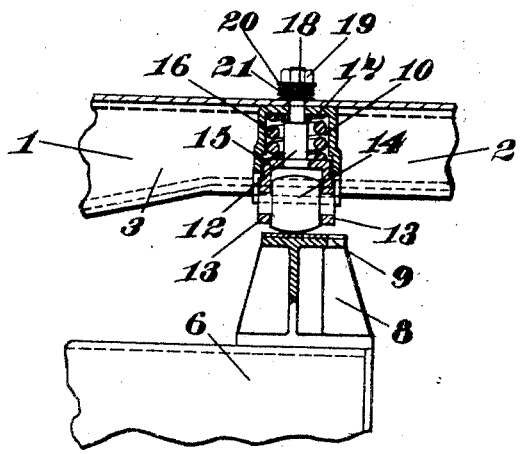

Referring to the drawings in which like reference characters refer to like parts, Fig. 1 is a plan view of portions of the adjacent ends of two car bodies of the articulated car unit; Fig. 2 is an enlarged longitudinal sectional view of the same taken on the line 2—2 of Fig. 1, and Fig. 3 is a cross sectional view of the same, taken on the line 3—3 of Fig. 2.

Referring now in detail to the drawings the reference character 1 indicates an articulated car unit which comprises a plurality of car bodies 2, the adjacent end portions 3 of two of which have been shown in the drawings. These ends 3 are provided with body center plates 4, both of which engage a truck center plate 5 mounted on a truck bolster 6, which bolster is a part of the truck 7. These center plates 4 and 5 are so formed that they engage with each other in such a manner as to permit the bodies 3 of the unit to move freely relative to each other and to the truck as the car unit rounds a curve or when the bodies sway from side to side. On each side of the longitudinal center line of the truck 7 a truck side bearing 8 is provided, which is secured to the top of the bolster 6. This side bearing member extends transversely the bolster and the upper portion 9 is of such a length that the ends thereof are overlapped by the adjacent ends 3 of two of the bodies. Above the truck side bearings each of the adjacent ends 3 of adjacent underframes is provided with body side bearings 10, which are adapted to engage with the truck side bearings.

Each of these body side bearings comprises a member 11, which is loosely mounted in the underframe preferably in a recess 12 formed in the underframe, such recess being preferably circular for a portion of its length, and preferably square for the remainder of its length. The lower portion of the member 11 is provided with spaced lugs 13, between and in which a roller 14 is rotatably mounted, such roller being adapted to engage with the upper surface 9 of the truck side bearing 8. Above the roller 14 this member is provided with a spring seat 15, on which the lower end of a spring 16 seats, the upper end of such spring seating on the inner surface of the top wall 17 of the recess 12. The spring seat 15 is preferably square in form and fits loosely in the square portion of the recess 12 and will permit free vertical movement between the side bearing and the underframe, but will prevent any undue rotation of the side bearing relative to the underframe. This member is also provided with a projection 18, which extends upwardly from the spring seat 15, through the spring 16 and through the wall 17, which forms the top of the recess 12, and adjacent the upper end thereof is provided with a nut 19 and washer 20. To prevent the washer from chattering a spring 21 is provided which surrounds the projection 18 and at its lower end seats on the wall 17 and at its upper end seats on the under side of the washer 20. It will be noted that the body side bearings are movable vertically relative to the underframe and that the springs mounted in the underframe and seated on the member 11, render the side bearings automatically adjustable, thus insuring a proper bearing between the car body and the truck at all times and under all service conditions.

It will be apparent to those skilled in the art to which this invention appertains that changes may be made in the details of the several parts forming the invention without departing from the spirit and scope of the appended claims.

Having thus described the invention, what

I claim as new and desire to secure by Letters Patent is:—

1. In an articulated car comprising a plurality of bodies, a truck, a side bearing on said truck, said bearing extending beneath the adjacent ends of two of said bodies, and an adjustable side bearing on each of said bodies adapted to engage with the side bearing on said truck.

2. In a car comprising a plurality of connected bodies, adjustable side bearings on the adjacent ends of two of said bodies, a truck, and side bearings on said truck, each of the side bearings on said truck being adapted to be engaged by one of the side bearings on each of said bodies.

3. In a car comprising a plurality of car bodies, a truck supporting the adjacent ends of two of said bodies, a side bearing on said truck, and a movable side bearing on each of said ends adapted to engage with the side bearing on said truck.

4. In a car comprising a plurality of car bodies, a truck supporting the adjacent ends of two of said bodies, roller side bearings mounted on said ends, and side bearings on said truck having flat bearing faces with which said roller side bearings are adapted to engage.

5. In a car comprising a plurality of car bodies, a truck supporting the adjacent ends of two of said bodies, yieldable roller side bearings mounted on each of said ends, and side bearings on said truck having flat bearing faces adapted to engage with the side bearings on said bodies.

6. In a car comprising a plurality of car bodies, a truck supporting the adjacent ends of two of said bodies, a vertically movable side bearing mounted on each of said ends and side bearings on said truck having flat bearing faces adapted to engage with the side bearings on said bodies.

7. In an articulated car comprising a plurality of car bodies, a truck supporting the adjacent ends of two of said bodies, a side bearing mounted in each of said ends to move vertically, a side bearing on said truck extending beyond and engaging with each of the side bearings on said bodies.

8. In an articulated car comprising a plurality of car bodies, a truck, a bolster forming part of said truck, a truck side bearing mounted on said bolster, and a body side bearing on each of the adjacent ends of two of said bodies adapted to move relative to said ends and yieldably engage said truck side bearing.

9. In an articulated car comprising a plurality of car bodies, a truck supporting the adjacent ends of two of said bodies, side bearings yieldably mounted in said ends and truck side bearings mounted on said truck and each adapted to engage with one of the side bearings on one of said ends and with one of the side bearings on the other of said ends.

10. In an articulated car comprising a plurality of car bodies, a truck supporting the adjacent ends of two of said bodies, each of said ends having recesses formed therein, a resilient means in each of said recesses, a body side bearing mounted on said resilient means, and a truck side bearing mounted on said truck adapted to be engaged by one of the body side bearings on each of said ends.

11. In an articulated car comprising a plurality of bodies, a truck supporting the adjacent ends of two of said bodies, a bolster forming part of said truck, a side bearing rigidly mounted on said bolster, and a side bearing mounted in each of said ends, and adapted to yieldably engage the side bearing on said truck.

12. In a body side bearing for articulated car comprising a roller positively connected with said body and having a limited vertical movement in both directions.

13. In a body side bearing for an articulated car comprising a vertically movable member mounted directly in said car, a rotatable member secured to said vertically movable member, and means for limiting the vertical movement of said movable member in both directions.

14. In a body side bearing for an articulated car comprising a roller yieldably and directly supported by said car to move vertically, and means for limiting the vertical movement of said roller in both directions.

15. In a car, a plurality of car bodies, a truck connecting and supporting the adjacent ends of two of said bodies, a side bearing on said truck and body side bearings on said ends adapted to engage with the truck side bearing, each of said body side bearings comprising a portion movably mounted in one of said ends, and a roller mounted on said portion adapted to engage with said truck side bearing.

In testimony whereof, I affix my signature.

ALFRED K. PEHRSON.